United States Patent
Colligan et al.

(10) Patent No.: US 11,727,818 B1
(45) Date of Patent: Aug. 15, 2023

(54) AIRCRAFT SURFACE STATE EVENT TRACK SYSTEM AND METHOD

(71) Applicant: Architecture Technology Corporation, Minneapolis, MN (US)

(72) Inventors: William Colligan, Vienna, VA (US); Eric R Chartier, St Louis Park, MN (US); Paul Davis, San Jose, CA (US); Andrew Murphy, Washington, DC (US); Douglas Sweet, Sunnyvale, CA (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 17/542,913

(22) Filed: Dec. 6, 2021

Related U.S. Application Data

(63) Continuation of application No. 16/357,216, filed on Mar. 18, 2019, now Pat. No. 11,195,423.

(51) Int. Cl.
    *G08G 5/00*     (2006.01)
    *B64D 45/00*     (2006.01)

(52) U.S. Cl.
    CPC ......... *G08G 5/0078* (2013.01); *B64D 45/00* (2013.01); *G08G 5/0008* (2013.01);
    (Continued)

(58) Field of Classification Search
CPC .. G08G 5/0078; G08G 5/0008; G08G 5/0013; G08G 5/0026; G08G 5/0043; B64D 45/00; B64D 2045/0075
(Continued)

(56) References Cited

U.S. PATENT DOCUMENTS

| | | | |
|---|---|---|---|
| 7,479,925 B2 * | 1/2009 | Schell | G01S 13/933 342/30 |
| 7,664,596 B2 * | 2/2010 | Wise | G08G 5/0043 701/120 |

(Continued)

FOREIGN PATENT DOCUMENTS

| | | | | |
|---|---|---|---|---|
| EP | 2211324 A2 * | 7/2010 | | G08G 5/045 |
| WO | WO-02071367 A1 * | 9/2002 | | G01S 19/17 |
| WO | WO-03107299 A2 * | 12/2003 | | B64F 1/002 |

OTHER PUBLICATIONS

Changyou et al., "Aircraft Taxi Path Optimization Based on Ant Colony Algorithm," 2011, vol. 2, Publisher: IEEE.*

(Continued)

*Primary Examiner* — Tuan C To
(74) *Attorney, Agent, or Firm* — Key IP Law Group, PLLC

(57) ABSTRACT

A method, executed by a processor, includes the processor receiving signals information from a device located on a departing airplane; verifying an identification of the airplane and identifying an expected departure sequence of aircraft surface states; monitoring and identifying additional signals information received from the mobile device, including comparing the additional signals information to known data; logging the additional signals information, and processing the additional signals information, and determining the logged data corresponds to events indicative of an aircraft surface state; sending an aircraft surface state reached message to Local and Center flight management; and executing a statistical routine and providing statistical data from the execution relating to an occurrence of upcoming aircraft surface state event and sending the statistical data with the aircraft surface state message.

18 Claims, 10 Drawing Sheets

(52) U.S. Cl.
CPC ......... *G08G 5/0013* (2013.01); *G08G 5/0026* (2013.01); *G08G 5/0043* (2013.01); *G08G 5/0082* (2013.01); *B64D 2045/0075* (2013.01)

(58) Field of Classification Search
USPC ........................................................ 701/120
See application file for complete search history.

(56) References Cited

U.S. PATENT DOCUMENTS

| | | | | | |
|---|---|---|---|---|---|
| 7,941,108 | B2* | 5/2011 | Shaffer | ................ | H04W 24/08 455/67.14 |
| 8,612,581 | B1* | 12/2013 | Craig | ................... | H04L 41/069 709/224 |
| 9,842,506 | B2* | 12/2017 | Ridenour, II | .......... | G08G 5/045 |
| 10,242,582 | B1* | 3/2019 | Ogden | .................. | B64D 25/00 |
| 2004/0225440 | A1* | 11/2004 | Khatwa | .................. | G01S 19/15 340/945 |
| 2006/0214816 | A1* | 9/2006 | Schell | ................. | G08G 5/0078 340/961 |
| 2007/0078590 | A1* | 4/2007 | Meunier | .............. | G08G 5/0082 701/120 |
| 2012/0102152 | A1* | 4/2012 | Pearson | .................. | H04L 43/12 709/219 |
| 2015/0194059 | A1* | 7/2015 | Starr | ..................... | G06F 3/0484 701/3 |
| 2016/0086493 | A1* | 3/2016 | McGehee, IV | ...... | G08G 5/0021 244/114 R |
| 2016/0379499 | A1* | 12/2016 | Balasubramanian | .. | G08G 5/065 701/300 |
| 2017/0032687 | A1* | 2/2017 | Lamkin | ................ | G08G 5/0082 |
| 2017/0061806 | A1* | 3/2017 | Daveau | .................... | G08G 5/02 |
| 2018/0144646 | A1* | 5/2018 | Nitzan | ................ | G08G 5/0026 |
| 2019/0172361 | A1* | 6/2019 | Schwindt | ................ | G08G 5/0021 |

OTHER PUBLICATIONS

V.H.L., Cheng et al., "A Study of Aircraft Taxi Performance for Enhancing Airport Surface Traffic Control," 2001, vol. 2, Publisher: IEEE.*

Dana et al., "Real Time Runway Incursion Cockpit Advisory," 2007, Publisher: IEEE.*

* cited by examiner

AIRCRAFT SURFACE STATE EVENT TRACK SYSTEM AND METHOD

RELATED APPLICATIONS

This application is a continuation of U.S. patent application Ser. No. 16/357,216, filed Mar. 18, 2019, and entitled AIRCRAFT SURFACE STATE EVENT TRACK SYSTEM AND METHOD, which is a continuation of U.S. patent application Ser. No. 15/588,574, filed May 5, 2017, now U.S. Pat. No. 10,235,892, issued Mar. 19, 2019, and entitled AIRCRAFT SURFACE STATE EVENT TRACK SYSTEM AND METHOD, the disclosure of which is incorporated by reference.

BACKGROUND

Air traffic control uses a complex regime of systems, methods, rules, and procedures, some dictated by government agencies, to ensure safe and efficient movement of aircraft, on the ground and in the air. One aspect of this regime involves evaluation of aircraft-related events at a departure airport to predict events at an arrival airport. For example, whether an airplane makes its arrival slot may depend on whether the same airplane departed on time. Whether an airplane makes its scheduled departure time may depend on events that occur on movement and non-movement areas of the departure (origination) airport.

One example procedure currently in use in this regime is that, after takeoff, aircraft may be directed to merge into en route (Center) airspace traffic flows—the aircraft are "metered." (In air traffic control, an Area Control Center (ACC), also known as a Center (or in some cases, en-route, as opposed to TRACON control), is a facility responsible for controlling aircraft en route in a particular volume of airspace (a Flight Information Region) at high altitudes between airport approaches and departures. Such a Center also may be referred to as an Air Route Traffic Control Center (ARTCC)). Departure and arrival airports may be in the same Center, or in separate Centers. In some cases, constraints associated with these Center traffic flows create localized demand/capacity imbalances—that is, demand for space or slots in a Center traffic flow exceeds capacity of the Center traffic flow. When demand exceeds capacity, Traffic Management Coordinators (TMCs) at a Center and Frontline Managers (FLMs) at a Local airport may use a procedure referred to as tactical departure scheduling to manage the flow of departures into the constrained Center traffic flow. Tactical departure scheduling usually involves a Call for Release (CFR) procedure in which a Local air traffic control (i.e., at a Local airport Tower) calls the Center to coordinate an aircraft release time prior to allowing the aircraft to depart. Currently, release times are computed at the Center using a Center Traffic Management Advisor (TMA) decision support tool, based upon manual estimates of aircraft ready time that are verbally communicated from the Tower to the Center. The TMA-computed release time then is verbally communicated from the Center back to the Tower where the release time is relayed to the Local air traffic controller as a release window, which typically is three minutes wide. The Local air traffic controller manages aircraft departure to meet the coordinated release time window. Manual ready time prediction by the Local air traffic controller and verbal release time coordination between the Local and Center are labor intensive and prone to inaccuracy. Also, use of release time windows adds uncertainty to the tactical departure process. Currently, many tactically-scheduled aircraft miss their en route slot due to ready time prediction uncertainty.

Furthermore, about 25% of arrival-metered aircraft involve a tactical departure. This means that 25% of inbound flights metered by an arrival TMA system (i.e., at an Arrival Center) are scheduled (i.e., have slots reserved) in the overhead stream while the aircraft still are on the surface at the departure airport. An emerging demand for tactical departure scheduling and the significant uncertainty tactically-scheduled aircraft represent to the en route schedule, increases the importance of integrating departure airport surface information into departure scheduling.

The Aircraft Communications Addressing and Reporting System (ACARS), introduced in 1978, provided a digital datalink system for transmission of short messages between aircraft and ground stations via airband radio or satellite. One aspect of ACARS is the ability to automatically detect and report the start of each major flight phase, called OOOI (out of the gate, off the ground, on the ground, and into the gate). About 70% of U.S. commercial flights involve OOOI events. These OOOI events are detected using input from aircraft sensors mounted on doors, parking brakes, and struts. At the start of each flight phase, an ACARS message is transmitted to the ground describing the flight phase, the time at which it occurred, and other related information such as the amount of fuel on board or the flight origin and destination. These messages are used to track the status of aircraft and crews. However, ACARS cannot predict whether an airplane will meet its scheduled states, such as departure states gate pushback, runway entry, and takeoff, and ACARS does not provide information that allows Center and Local flight management personnel to coordinate aircraft departure and thereby improve departure slot performance.

Airport surface surveillance using traditional radar-based or multilateration systems have the potential to improve departure slot performance, but may not be a viable option. Airport surface surveillance systems are very expensive to procure, install, and maintain. The high cost makes these surface surveillance systems impractical for most airports. Furthermore, surveillance in an airport's non-movement presents additional challenges such as limited line-of-sight and multipath interference caused by buildings and other structures. Still further, the FAA is responsible for movement areas of an airport while the airport is responsible for non-movement areas, and the FAA does not surveil the non-movement areas, and does not use non-movement area surveillance. Other complications lessen the reliability of current surface surveillance systems.

SUMMARY

A method, executed by a processor, includes the processor receiving signals information from a device located on a departing airplane; verifying an identification of the airplane and identifying an expected departure sequence of aircraft surface states; monitoring and identifying additional signals information received from the mobile device, including comparing the additional signals information to known data; logging the additional signals information, and processing the additional signals information, and determining the logged data corresponds to events indicative of an aircraft surface state; sending an aircraft surface state reached message to Local and Center flight management; and executing a statistical routine and providing statistical data from the execution relating to an occurrence of upcoming aircraft surface state event and sending the statistical data with the aircraft surface state message.

A non-transitory, computer-readable storage medium having encoded thereon machine instructions that when executed by a processor, cause the processor to receive signals information from a device located on a departing airplane; verify an identification of the airplane and identify an expected departure sequence of aircraft surface states; monitor and identify additional signals information received from the mobile device, wherein the processor: compares the additional signals information to known data; logs the additional signals information, and processes the additional signals information, and determines the logged data corresponds to events indicative of an aircraft surface state; sends an aircraft surface state reached message to Local and Center flight management; and executes a statistical routine and provides statistical data from the execution relating to an occurrence of upcoming aircraft surface state event and sending the statistical data with the aircraft surface state message.

An aircraft surface state event track (ASSET) system, comprises a mobile device installed on an aircraft, the mobile device comprising sensors to record signals information indicative or operation of the aircraft; and a processor in communication with the mobile device. The processor executes machine instructions to receive signals information from the mobile device, identify the signals information received from the mobile device, compare the identified signals information to known data, based on the comparison, determine the aircraft is at a defined aircraft surface state, send an aircraft surface state reached message to Local and Center flight management; and execute a statistical routine and provide statistical data from the execution relating to an occurrence of upcoming aircraft surface state and send the statistical data with the aircraft surface state message.

DESCRIPTION OF THE DRAWINGS

The detailed description refers to the following figures in which like numerals refer to like items, and in which.

DETAILED DESCRIPTION

Figure 1A:
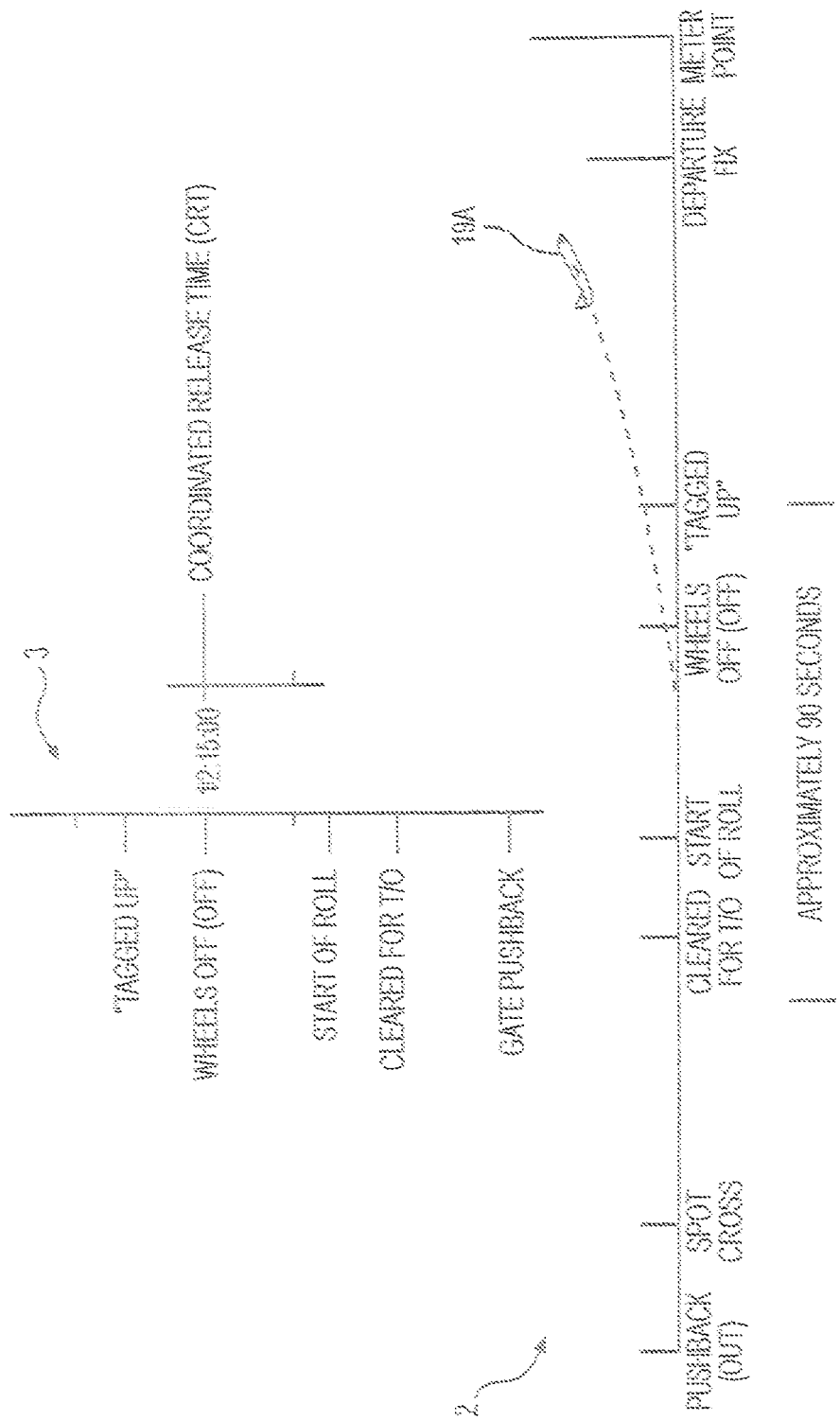
FIG. 1A shows a profile and time line of events that occur during take-off of a tactically-scheduled aircraft.

At airports large and small, safe and efficient aircraft traffic management requires accurate information about aircraft on the airport surface, from gate to runway. However, only a few U.S. airports have surface surveillance systems, and in almost every case coverage is limited to the airport's movement area. In addition, safe and efficient aircraft traffic management requires accurate and timely aircraft arrival information, and such arrival information may be affected by aircraft events that occur at the aircraft's departure (originating) airport.

In addition to improving airport safety by preventing incidents between and among moving aircraft and between and among moving aircraft and ground vehicles, a surface surveillance system also may improve airport efficiency by ensuring that scheduled aircraft arrivals and departures occur with minimal delays and at minimal intervals consistent with safety. For example, an airport may adopt a time-based flow management (TBFM) system that ensures efficient (i.e., on-time or on schedule) aircraft departure considering on-time considerations for aircraft arrival. That is, an aircraft's departure time may need to be met to ensure the aircraft's arrival fits into a crowded aircraft arrival stream. If the departing aircraft is not able to take off within its scheduled departure slot, a corresponding slot in the arrival stream may go unused. A series of missed departures slots can result in runway starvation, resulting in wasted resources, additional arrival and/or departure delays and frustrated travelers.

While airports have installed surface surveillance systems to address the above noted concerns, only 43 of the more than 500 "towered" airports in the U.S. National Airspace System (NAS) have surface surveillance and only a small fraction of those have non-movement area surveillance. Furthermore, the only U.S. airport with an operational departure management system (DMS) is JFK International Airport (JFK). The JFK DMS uses one surveillance system for movement area (e.g., runway, taxiway) surveillance and another surveillance system for the airport's non-movement area (i.e., areas on which aircraft may be found, other than runways and taxiways). At JFK, a departure coordinator may use the non-movement area surveillance to verify a flight will meet its intended time to enter the movement area (i.e., in preparation for takeoff). If the airline provides an estimated time for gate pushback, the departure coordinator could use non-movement area surveillance to determine whether a flight likely will meet its target movement area arrival time. If the aircraft is late departing the gate, the departure coordinator may change the departure sequence to minimize missed runaway opportunities. However, without non-movement area surveillance data, the departure coordinator may not be able to accurately estimate if the aircraft will meet its target movement area arrival time. Missed movement area arrival times create holes or inefficiencies in the departure sequence resulting in suboptimal runway use.

To address efficient airport operations while maintaining required safety, disclosed herein are systems and methods that may improve airport departure and arrival performance, regardless of airport size, without the installation and maintenance of expensive and complicated automated surface surveillance systems, such as those at JFK. The systems and methods determine aircraft surface state at several points in a departure sequence. The systems and methods further provide a confidence interval and/or level that certain of the states will be reached or achieved at an expected time. The occurrence of the states and corresponding confidence intervals and levels are passed to Local air traffic control and other flight management personnel and systems. This information then may be passed to Center flight management personnel and systems. The information thus passed allows flight management personnel and systems to assess if a departing aircraft will meet its intended arrival time, or in the case of metered aircraft, if the departing aircraft will reach its designated en route slot.

The herein disclosed systems and methods may refer to the following terms and their definitions (for some terms, the definition(s) provided comes from a government agency (e.g., FAA) or a non-government body (e.g., International Civil Aviation Organization (ICAO)); other terms, and their definitions, are provided for ease of description of the herein disclosed inventions), and such references will be understood to incorporate the definitions provided herein for these terms.

Automatic dependent surveillance-broadcast (ADS-B) refers to a surveillance technology in which an aircraft determines its position via satellite navigation and periodically broadcasts the position, enabling the aircraft to be tracked. The aircraft position information can be received by air traffic control ground stations as well as by other aircraft to provide situational awareness and allow self-separation between and among aircraft. ADS-B is "automatic" in that it requires no pilot or external input. ADS-B is "dependent" in that it depends on data from the aircraft's onboard equipment Airline operations center (AOC) refers to a control center used by a specific airline or air carrier.

Airport movement area refers to the runways, taxiways, and other areas of an airport that are used for taxiing, takeoff, and landing of aircraft, exclusive of loading ramps and aircraft parking areas (See 14 C.F.R. § 139.3 (Definitions)).

Airport non-movement area refers to aircraft loading ramps and aircraft parking areas; the term "non-movement area" is not defined in 14 C.F.R. § 139.3.

Airport Surface Detection Equipment, Model X, or (ASDE-X) refers to a runway-safety tool that enables air traffic controllers to detect potential runway conflicts by providing detailed coverage of movement on runways and taxiways. By collecting data from a variety of sources, ASDE-X tracks vehicles and aircraft on airport surfaces and obtains identification information from aircraft transponders.

Automated airport surveillance system refers to a radar system used at airports to detect and display the position of aircraft in the terminal area and the airspace around the airport, and may constitute the main air traffic control system for the airspace around airports. At large airports, the surveillance typically controls traffic within a radius of 30 to 50 nautical miles of the airport.

Center refers to a central flight management entity that may provide regional airspace control and monitoring for several airports. The Center may communicate with Local air traffic control and other entities at each of its serviced airports and with other Centers.

Center flight management refers to systems, such as the TMA, organizations, and personnel at the Center that operate to manage flights through the airspace under Center supervision.

Commercial off-the-shelf (COTS) refers to commercially available components that may be incorporated in various airport and aircraft systems.

Electronic Flight Bag (EFB) refers to an electronic information management device that helps flight crews perform flight management tasks more easily and efficiently with less paper. The EFB includes a computing platform intended to reduce, or replace, paper-based reference material often found in the pilot's carry-on flight bag, including the aircraft operating manual, flight-crew operating manual, and navigational charts (including moving map for air and ground operations). In addition, the EFB can host purpose-built software applications to automate other functions normally conducted by hand, such as performance take-off calculations. The FAA has defined three different classes of EFB which specify the level of connectivity with the aircraft and the types of applications that can be run. Class 1 is a commercial off-the-shelf (COTS) mobile device, such as a tablet, that does not connect to the aircraft's systems and does not require certification. Class 2 is a portable COTS device that can be temporarily connected to the aircraft's power supply, data ports, or antennas. Class 3 EFBs are fully installed on the aircraft and must meet airworthiness certification regulations. An expected revision to the FAA's classification scheme will simply categorize EFB as either "Portable" or "Installed".

Estimated off block time (EOBT) refers to the estimated time an aircraft will begin movement associated with departure (i.e., move off its gate/stand).

Freeze horizon refers to the time at which an aircraft's scheduled time of arrival (STA) at a specific geographical point becomes fixed. This setting ensures that last minute changes to the ETA are avoided. This setting can be expressed as a prescribed flying time to the meter fix.

Local flight management, or Local air traffic control refers to systems, organizations, and personnel, at a Local airport, that execute processes or supervise systems to control aircraft on the non-movement areas of the Local airport and that interface with aircraft during takeoff from and approach to the Local airport.

Metering times refers to times aircraft are assigned to reach certain points, and metering times are an aspect of Time Based Flow Management (TBFM), a tool intended to manage traffic flows by scheduling and spacing aircraft to their arrival airport. (Not all commercial aircraft currently are metered.) Through TBFM, an automation system uses a schedule of runway assignments and landing times to sequence inbound flights, and allocates delays to various segments of each flight to meet the assigned schedule. TBFM is administered by traffic managers at an Air Route Traffic Control Center (ARTCC).

Multilateration refers to a surveillance technology that calculates an aircraft's position from the small differences in timing of when a transponder signal from the aircraft is received by ground antennas. Any transponder-equipped aircraft can be tracked by multilateration.

Ramp refers to a non-movement area where pre-flight activities, such as parking and maintenance.

Runway, in the parlance of the International Civil Aviation Organization (ICAO), refers to a "defined rectangular area on a land aerodrome prepared for the landing and takeoff of aircraft."

Surface movement radar (SMR) refers to radar systems used to non-cooperatively detect objects (e.g., aircraft, vehicles, people, wildlife) on the surface of an airport. Air traffic controllers may use SMR to supplement visual observations. SMR also may be used at night and during low visibility to monitor the movement of aircraft and vehicles.

Target movement area entry time (TMAT) refers to the time a departing aircraft is planned to transition from the non-movement area of an airport to the movement area. A TMAT is generated as a part of departure sequencing and flight operators plan their departure process in order to achieve that TMAT. TMATs may be specified to meter the rate of departure entries into the movement area of the airport.

Target off block time (TOBT) refers to a point in time to be monitored and confirmed by the airline/handling agent at which the ground handling process is concluded, all aircraft doors are closed, all passenger boarding bridges have been removed from the aircraft and thus start-up approval and push-back/taxi clearance can be received.

Terminal radar approach control facility (TRACON) refers to a centralized control station that provides approach and departure services for one or more airports, including the safe, orderly, and expeditious flow of arrival, departure, and en-route traffic.

Time-Based Flow Management (TBFM) refers to a FAA program that implements a time-based air traffic scheduling and spacing automation tool to optimize aircraft movement.

Traffic Management Coordinator (TMC) refers to an air traffic control position, at an en route facility (Center) who is responsible for ensuring that efficient and effective traffic management is maintained.

FIG. 1A illustrates a profile 2 and time line 3 of events that occur during take-off of a tactically-scheduled aircraft. A similar profile may exist for any aircraft take-off; the main difference being a Coordinated Release Time negotiated between Center and Local flight management personnel. In FIG. 1A, airplane 19A is seen departing from a Local airport with a Coordinated Release Time. The profile 2 shows a series of aircraft states and events, all of which occur with some time variability. The profile 2 begins with a gate pushback event or state followed by a spot cross event or state (the airplane 19A leaves the ramp and enters a taxiway, for example). Next is Cleared for T/O, which is the time at which the Local air traffic controller issues a takeoff clearance, and is the time at which control of actual takeoff is ceded to the pilot. Ideally, the tower air traffic controller issues the takeoff clearance so that airplane 19A takes off within a time widow of the Coordinated Release Time. However, variability in some of the next events may cause the window to be missed. Start of roll occurs at some variable time after the pilot receives the takeoff clearance. Start of roll variability results from human factors (i.e., the pilot) and aircraft characteristics. Wheels off (OFF) is the state at which the weight of the airplane 19A comes off its wheels and is the point at which the airplane 19A becomes airborne. The time between start of roll and OFF depends largely on meteorological conditions (e.g., temperature and wind), aircraft weight and aircraft characteristics (e.g., engine thrust, wing configuration). Tagged up is the time at which airplane 19A is acquired by TRACON surveillance and "tags up" on the radar scope. After tagged up, the airplane 19A proceeds to its departure fix and then its meter point.

Some events or states shown in FIG. 1A may be detected by onboard sensors. For example, OFF may be detected by a sensor that actuates when the wheel struts are fully retracted or by a sensor that detects when the wheel well doors close. Events or states leading up to takeoff are not so easily detected by current onboard sensors. In particular, events or states occurring in the airport's non-movement areas are not as amenable to accurate detection and monitoring by current onboard sensors.

Referring to an example of an aircraft (metered or not metered) preparing to depart an airport that does not have an automated surface surveillance system, prior to the assigned departure time the herein disclosed aircraft surface event state track (ASSET) system detects specific events that define or relate to various possible states of the aircraft. For example, the system may detect events that indicate the departing aircraft has pushed back from its gate. The system may compute a confidence level and/or interval that the occurrence of these events will result in the aircraft meeting its scheduled take-off time and then may provide a Traffic Management Coordinator (TMC) with a level of confidence or expectation that the aircraft will take off on time. The system then may pass the aircraft surface state information to other entities in a traffic management system.

In the above example, a departure reservoir coordinator (e.g., a Local air traffic controller) may use non-movement area surveillance provided by the aircraft surface state event track system to verify a flight will meet its target movement area entry time (TMAT). If the airline provides target off block times (TOBT), the departure reservoir coordinator could use the ramp area surveillance to determine whether a flight met its TOBT and likely will meet its TMAT. If not, the departure reservoir coordinator may change the departure sequence to minimize missed runaway opportunities.

Instead of actively tracking the location of all aircraft in the movement area, the aircraft surface state event track system provides a cost-effective approach for small/medium airports and for the non-movement areas of all airports by tracking certain aircraft states. For a departing aircraft, these states may include when the aircraft: (1) pushes back from the gate, (2) starts taxiing, (3) stops taxiing, (4) enters an airport movement area, and (5) takes off. Knowing the aircraft's state at these discrete points in time can provide enough information to compensate for a lack of surveillance. In an embodiment, the aircraft surface state event track system uses information from existing sensors in cockpit-based devices and uploads the data to an associated cloud-based system. The associated cloud-based system then determines aircraft states in both the movement and non-movement areas, and may predict the likelihood that the aircraft will meet its departure window. This information may be monitored by other systems/operators that implement strategic or tactical adjustments as needed to maintain airport and airspace efficiency.

Many air carriers have equipped their aircraft with Electronic Flight Bags. Many Class 1 and Class 2 EFBs may include devices with multiple sensors. The aircraft surface state event track system may access the sensors to obtain a variety of data that may be used to determine aircraft state. In aircraft without an EFB, cockpit crews may use mobile phones with similar internal sensors. In either situation, the mobile devices present in an airplane's cockpit should have a rich set of sensors that may provide information that may be interpreted to ascertain aircraft state. The mobile devices also provide a level of redundancy, and the devices combine and process data (e.g., location, acceleration, velocity, compass heading, sound, and vibration) from multiple sensors. For example, a mobile phone may have multiple sensors that can determine location (Wi-Fi, cellular, and GPS) and typically employs software that "chooses" the method that provides a reasonable result using the least amount of power (if running on battery). Accuracy of the location depends on the type sensor used and other factors such as distance from transmitters, line of sight, and electromagnetic interference, for example. Motion of the mobile device is determined by accelerometers and/or GPS. Microphones and other sensors built into the devices can also be used by the aircraft surface state event track system. For example, a comparison of acoustic signatures could determine when aircraft engines have been turned on or off.

In an embodiment, the aircraft surface state event track system includes a surface state event track system application and a surface state event track system service. The aircraft surface state event track system may use "Portable" EFBs and mobile devices that can transmit their sensor data. An application (an aircraft surface state event track system App) running on a device may access the sensor data via the device's operating system application programming interface (API). The sensor data may be securely transmitted to the surface state event track system service using a cellular link or another aircraft onboard datalink such as SatCom. The surface state event track system service may be cloud-based. Using the cloud means that servers and software are not required at each airport and additional resources can be inexpensively added to support increases in demand and the number of airports serviced.

The surface state event track system service analyzes the stream of mobile sensor data in real-time to derive aircraft state and state change events. Unlike a surveillance system, the surface state event track system service does not need to "know" the precise location of the aircraft. For example, the service may use as inputs, (1) an approximate aircraft location compared to a mapping of the airport's terminals, and (2) a lack of movement to determine that an aircraft is parked at a gate. The exact gate may not matter, just the fact that the aircraft is in a "gate state." When movement is detected over a sustained period, the surface state event track system service may generate a gate pushback event. Supplemental information sources may provide additional data as needed. For example, FlightStats.com can be used to determine gate assignments.

The surface state event track system service may compare the derived aircraft state information with key Traffic Flow Management (TFM) event times (e.g., EOBT, TMAT, metering times) and calculate a confidence interval and level for those times. The surface state event track system service may transmit the confidence interval and level to the appropriate stakeholders to improve their performance. For example, to improve arrival metering, the aircraft surface state event track system confidence of TBFM metering times may be sent to the TMC and airline operations center (AOC). Confidence values for TMATs may be provided to the departure reservoir coordinator and AOC to avoid missed departure slots. For departures from airports within the freeze horizon to metered airports, the aircraft surface state event track system may provide advanced notice to the TMC that an aircraft will not make its meter time. This advanced notice allows the TMC to adjust the arrival sequence and avoid "starving" the runway.

Figure 1B:
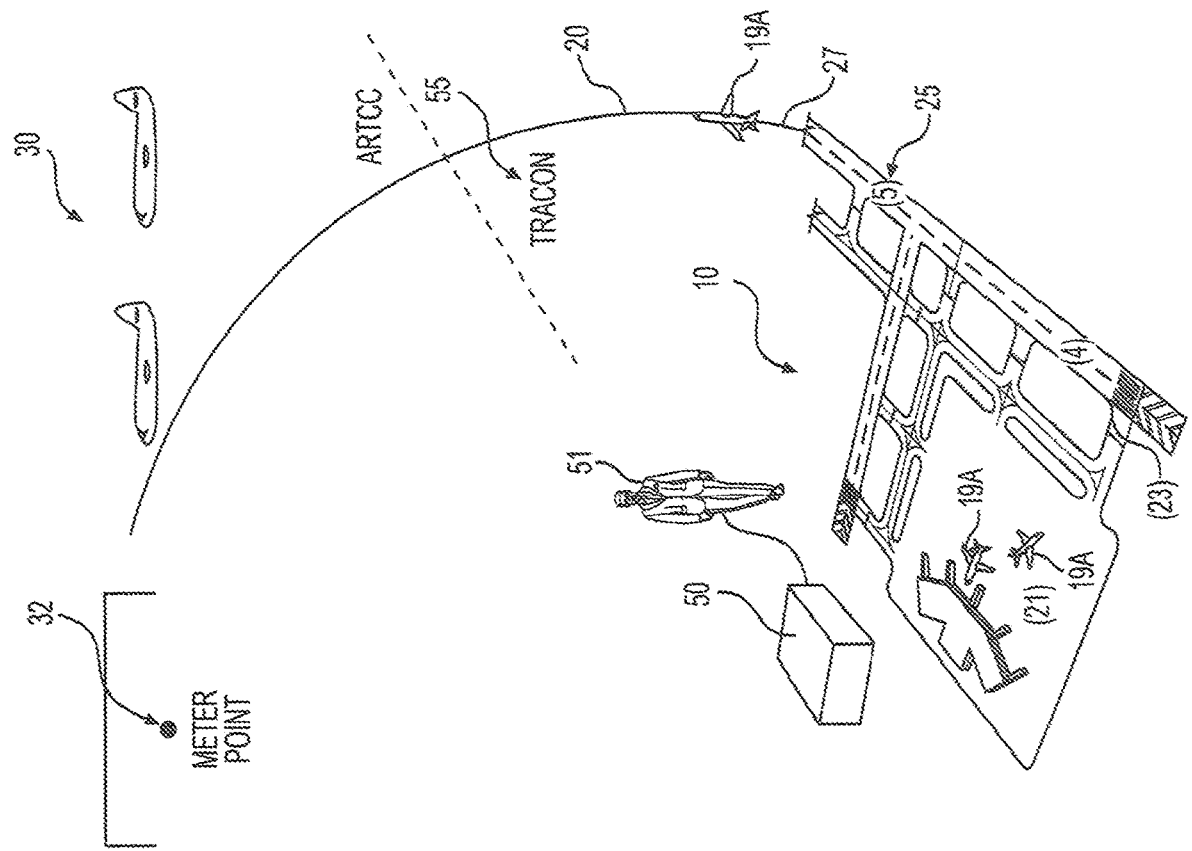
FIG. 1B illustrates a National Airspace System (NAS) environment in which departing aircraft must enter a metered time slot.
Figure 1B:
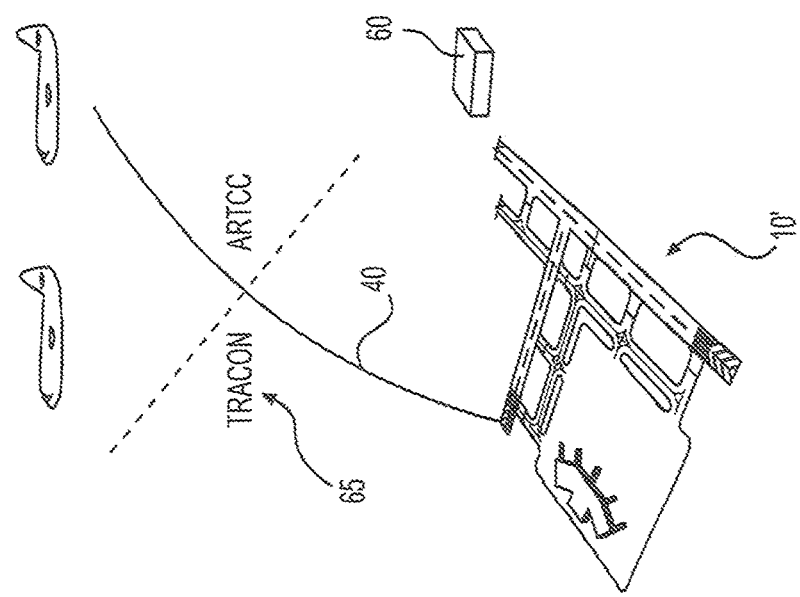
Figure 1C:
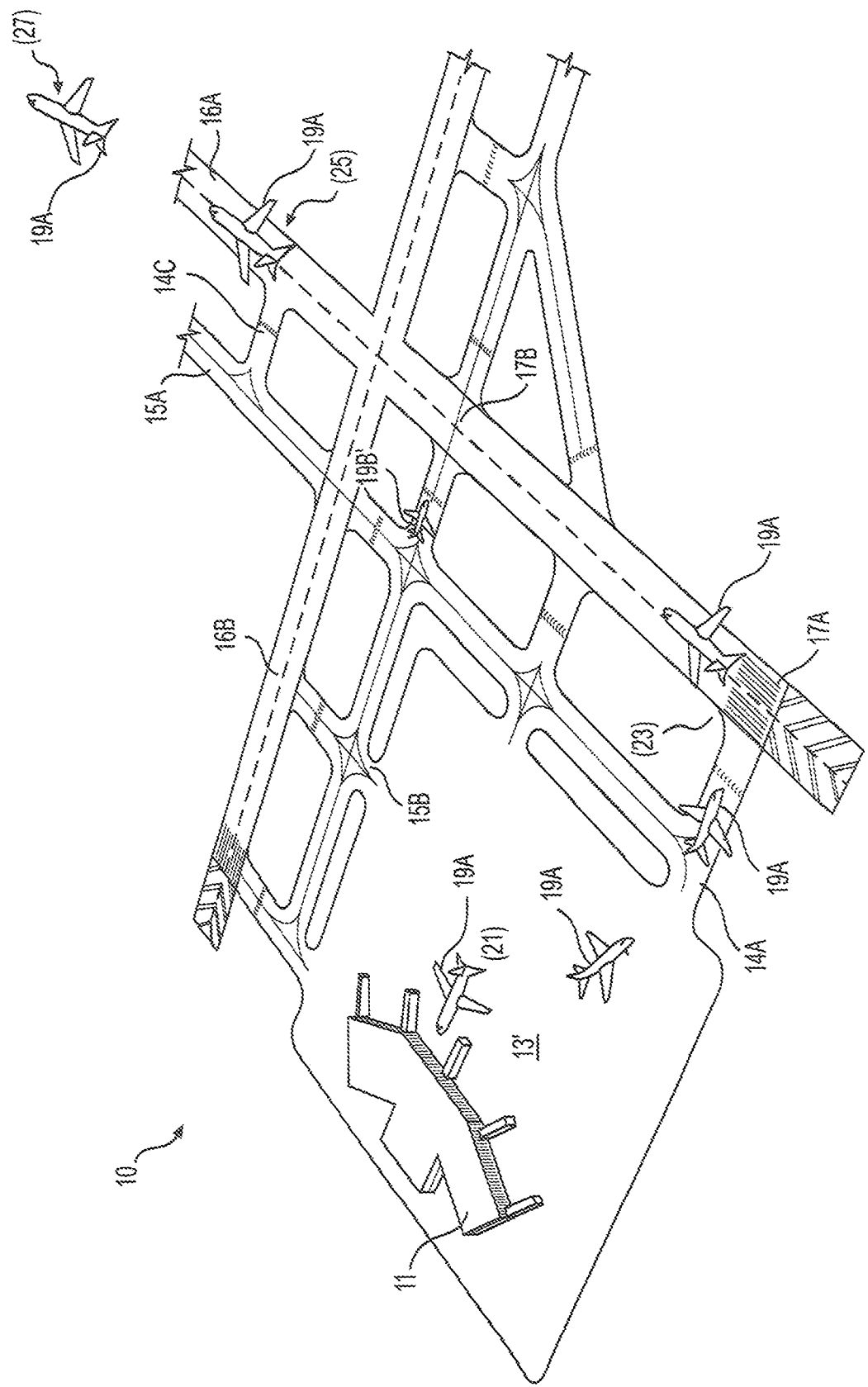
FIG. 1C illustrates an airport environment in which an example surface state event track system, and corresponding method, may be implemented.
Figure 1D:
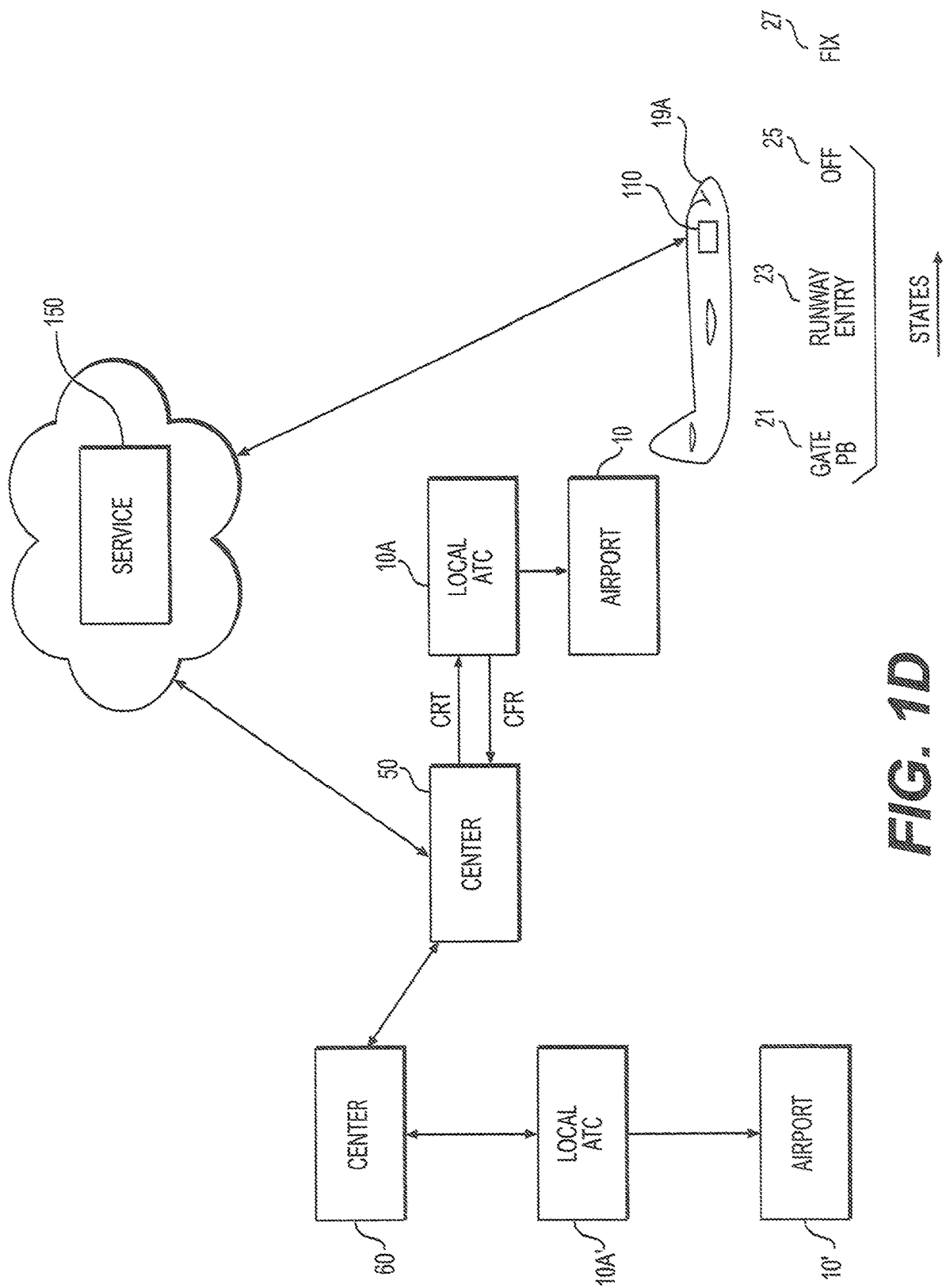
FIG. 1D illustrates, logically, communication flows for departure of a tactically-scheduled aircraft.

FIG. 1B illustrates a National Airspace System (NAS) environment in which an aircraft 19A departing airport 10 must enter a metered time slot 32 en route 30 to arrival airport 10'. FIG. 1C illustrates the airport 10 in detail. FIG. 1D illustrates a logical flow of information corresponding to aircraft 19A's departure from airport 10 and travel to arrival airport 10'.

In FIG. 1B, airplane 19A is scheduled to depart airport 10 inside the freeze horizon (i.e., an internal departure) and is given arrival slot 32 within arrival stream 30 to TBFM destination airport 10'. Aircraft 19A proceeds through several distinct and identifiable "states", including, for example aircraft gate pushback 21, runway entry 23, and take-off (OFF) 25 for entry into departure stream 20. During departure, aircraft 19A may be under control of Local air traffic control at airport 10, and TRACON 55. Aircraft 19A transitions to control in ARTCC 35 and enters en route stream 30, slot 32, at the meter point. If the departure states occur as expected, the TMC's (e.g., TMC 51 at Center 50) confidence that the airplane 19A will merge into the en route stream 30 in the designated slot 32 is increased. If any of the departure states are missed or are late, the TMC 51 (or a TMC at Center 60) may have additional time to change the arrival sequence 40 for the arrival airport 10' to support the internal departure of aircraft 19A from airport 10. Aircraft surface state event track system 100 (see FIG. 2A) provides the Local air traffic control at airport 10, and by extension, the TMCs, an early indication of departure (e.g., gate pushback) and confirmation of departure (e.g., takeoff).

FIG. 1C illustrates airport 10 in which an example aircraft surface state event track system (see FIG. 2A), and corresponding method, may be implemented. In FIG. 1C, airport 10, which may be typical of many small or mid-size airports, does not include surveillance systems found at large airports, such as surface or ground radar systems and multilateration systems, for example. At airport 10, the herein disclosed aircraft surface state event track system may provide the sole system for tracking aircraft in non-movement areas. Those non-movement areas include at least the surface 13 (i.e., including a gate area) surrounding terminal 11, at which airplane 19A initially is parked (prior to gate pushback state 21). Also shown in FIG. 1C, airplane 19A moves from the gate area to ramp 14A and stops at intersection 17A before proceeding with runway entry (state (23). Aircraft 19A then proceeds with take-off, reaching OFF (state 25) and finally fix 27, at which point, aircraft 19A appears on air surveillance radar. Airport surface state event track system Apps (not shown in FIG. 1B) installed on mobile devices onboard airplane 19A (and on each of airplanes 18A, 19, and 19B), transmit signals (raw data and processed data) that may be received by the aircraft surface state event track system (also not shown in FIG. 1C). The surface state event track system service then may generate an advisory signal and message to alert Local airport control personnel (i.e., at airport 10 and the center 50) as to the status of each of the aircraft and a confidence level that relevant ones of the aircraft will make their target event times (e.g., airplane 19A's OFF time is within schedule).

FIG. 1D shows an example of information flow between and among the airplane 19A, the Centers 50 and 60, Local control at airports 10 and 10', and the aircraft surface state event track system. The airplane 19A implements components of the aircraft surface state event track system, mainly an application (App) 110 installed onboard the airplane 19A in, for example, mobile devices that may comprise a cockpit EFB (not shown in FIG. 1D). Remaining components of the aircraft surface state event system are shown, in an embodiment, as implemented in the cloud, as service 150.

Possible states of the airplane 19A are determined by the service 150 based on signals received, and in some cases processed, through control of the App 110. In an embodiment, the App 110 controls sensors and other components in mobile device 103 to transmit raw signal data to the service 150. For example, the App 110 may control the mobile device 103 to send audio signals picked up by a microphone in the mobile device 103 to the service 150. The App 110 also may control the mobile device 103 to send processed information, such as position information received by a GPS receiver to the service 150. The service 150 processes the received information to determine different events associated with the airplane 19A, and from the events, to determine various states of the airplane 19A. For example, the service 150 may associate a sound signature conforming to a signature for a jet engine as an indication the airplane 19A has its engines running, and a change of geographical position as an indication the airplane 19A is moving. The result of these processes is generation of a series of airplane states 21, 23, and 25 along with associated start and stop time for each state. Assuming the airplane 19A is departing the airport 10, the aircraft states should follow a general pattern with times that correspond to estimated or scheduled times (e.g., EOBT) for the airplane 19A. The service 150 then may pass the airplane state information to Local air traffic control 10A and to Center 50. The service 150 also may compute a confidence level that each of the required states to transition from gate to OFF will occur within the scheduled or estimated times for each of these states. For metered aircraft, the Local air traffic control 10A may communicate with the Center 50 to provide a call for release and receive a Coordinated Release Time (CRT). In an embodiment, the App 110 may perform some of the computations and operations of the service 150.

In an example, the departure airport 10 and the arrival airport 10' may be under control of different Centers (50 and 60) and different TRACONs. In this example, the Centers 50 and 60 may communicate regarding the progress of airplane 19A in its ascent to reach its meter point (slot 32 in en route stream 30). Finally, the center 50 may provide meter point data to the Local air traffic control 10A' for airport 10'.

A specific scenario in which the system 100 may improve scheduling involves a departing flight at a large airport without ramp surveillance. The aircraft needs to push back from the gate by a known time (based on ramp congestion and historical taxi times) to meet its TMAT. The system 100 operates to determine that the aircraft has pushed back from the gate. Depending on subsequent sensor data, the system 100 determines whether the aircraft pushed back and stopped (i.e., to record an on-time departure) or started to taxi to the spot. The system 100 notifies Local flight management personnel and systems that the TMAT appears to be realistic based on this information. The system 100 alerts local flight management personnel and systems when the system 100 predicts the aircraft will miss its TMAT by more than a configurable time, thereby allowing Local flight management personnel and systems to adjust the departure plan and recover the departure slot.

Another scenario involves a large storm system that causes widespread airport capacity reductions and temporarily shuts down a hub airport. Inbound aircraft are diverted to other airports. Some of these airports lack surface surveillance. Some lack gates. The crews shut down the aircraft engines while they wait for the storm to pass. As the aircraft sit on the tarmacs, crew duty-time limits (FAR Part 117) become a concern. The system 100 continues to automatically report the aircraft locations providing the AOC with the basic, but critical, information needed to efficiently recover their operations.

Figure 2A:
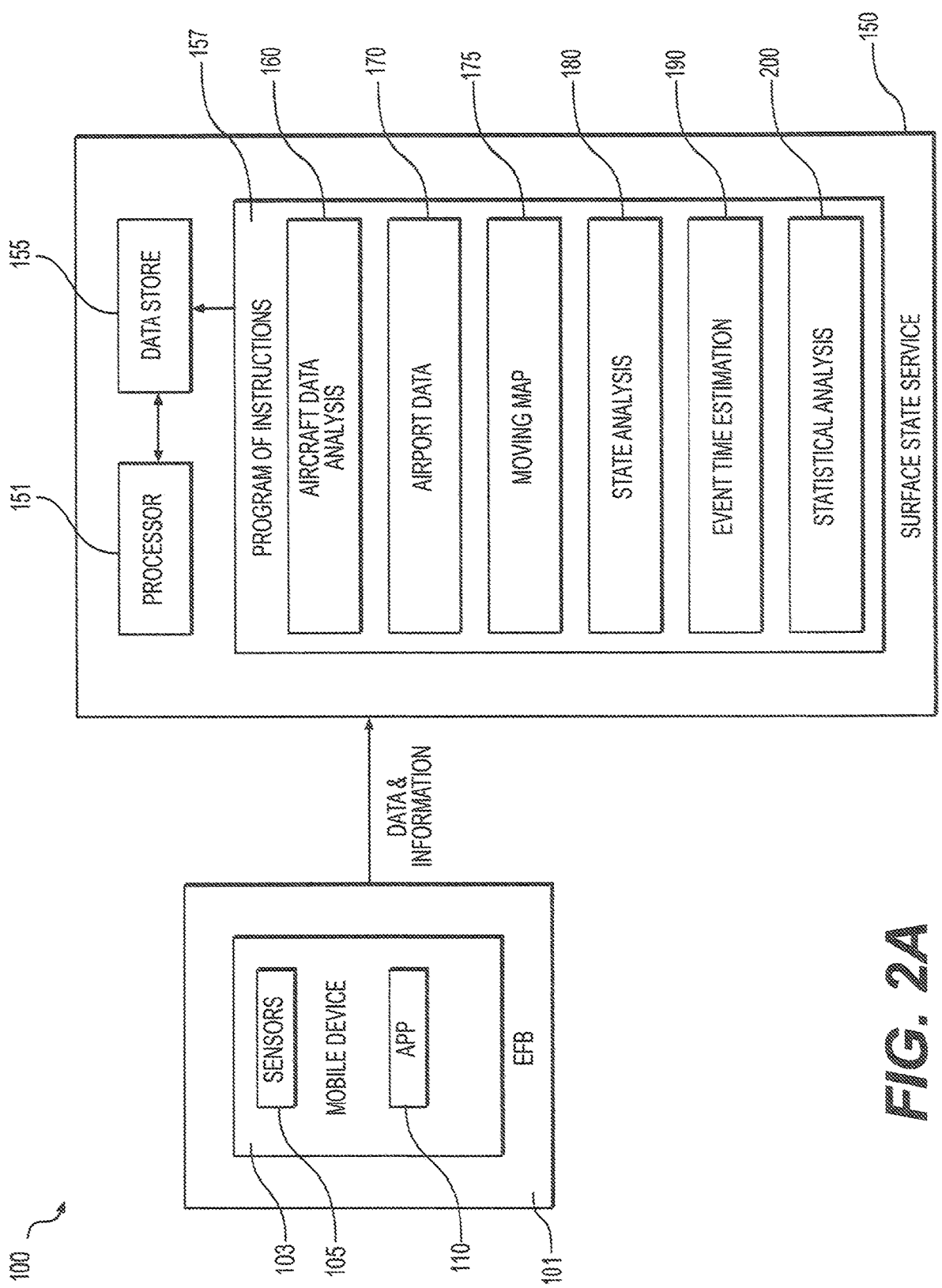
FIG. 2A illustrates an example aircraft surface state event track system.

FIG. 2A illustrates an example aircraft surface state event track system. In an embodiment, aircraft surface state event track system 100 is designed to determine aircraft surface states based on sensor data received from an aircraft onboard sensor suite, to predict a time from first aircraft surface state to future aircraft surface states, to compute a confidence level and interval that the aircraft's future surface states occur at the predicted or scheduled time, and to provide appropriate messaging and information to Local and Center flight management systems and personnel regarding the current aircraft surface state, future surface states, and the confidence levels associated with those future surface states. By performing as designed, the herein disclosed aircraft surface state event track system allows flight management personnel to assess if designated slots in departure, en route, and arrival streams will be filled by a specific airplane. For ease of description, the herein disclosed aircraft surface state event track system 100 is described as it relates to three specific aircraft surface states, namely, gate pushback, runway entry, and takeoff. However, those skilled in the art will appreciate that the herein disclosed aircraft surface state event track system 100 may be used to monitor, define, evaluate and report any other possible aircraft surface states.

In addition, the description may refer to aircraft operating under a tactical departure regime. However, the same or similar concepts would apply to any aircraft departure or arrival process or regime. The goal, in either tactical departure or non-tactical departure scenarios to provide appropriate flight management personnel with information and confidence that a specific aircraft will meet its intended takeoff time and arrive on time at its designated slot in whatever stream that slot exists.

The aircraft surface state event track system 100, in an embodiment, may operate without any pilot, cockpit crew, or other aircraft crew (collectively, aircrew) actions. That is, the system 100 may operate automatically and autonomously from the perspective of aircrew. Furthermore, the system 100 provides no outputs or information to the aircrew.

In FIG. 2A, aircraft surface state event track system 100 includes surface state event track App 110 and surface state event track system service 150. The App 110 is shown installed on mobile device 103, which is a component of EFB 101. The App 110 also may be installed on other mobile devices, including mobile devices that are not components of an EFB. In an embodiment, only one mobile device and one App operate to provide signals and information to the service. In another embodiment, the system 100 may use multiple mobile devices and multiple Apps to provide signals and information to the service 150. The App 110 receives information from sensors installed in the mobile device 103, including video camera 121, GPS receiver 123, microphone 125, cellular receiver 127, accelerometers 129, and other sensors. For example, the APP 110 may receive periodic GPS position updates from the GPS receiver 123. The App 110 then may provide the information received from the sensors to the service 150.

The service 150 is shown implemented as a cloud-based system, although other configurations and architectures are possible. In this implementation, the service 150 includes data store 155, aircraft data analysis module 160, airport data module 170, moving map module 175, state analysis module 180, and event time estimation module 190. In an embodiment, the service 150 further includes statistical analysis module 200.

The service 150 receives and stores inputs that include airport data, aircraft data, signals data, airplane information, and flight management data, and outputs alerts and messages to AOCs and other airport and airline management systems and personnel. The airport data include a map of the airport 10. The signals data include information and data such as GPS positions received from the mobile device 103. The aircraft data include aircraft identification and flight number as assigned by the airline. Airplane information includes design and configuration information for various aircraft types that may use the airport 10, including, for each aircraft type, number of engines, sound signature for the engines, operational characteristics, and other information. The flight management data includes EOBT, TMAT, and other time-based estimates assigned to a specific flight so that the flight reaches its meter point on time. The alerts and messages include aircraft state messages such as a gate pushback state message and a confidence level that the next aircraft state (in this case, for example, runway entry) is achieved on schedule.

The data store 155 stores airplane information for aircraft that may operate out of the airport 10. The data store 155 also stores flight management data for a specific flight. The data store 155 may store completed flight data such as actual time off block, OFF time, and other data to be used in system performance evaluation processes and airline, airplane, aircraft, and flight crew evaluation processes.

The aircraft analysis module 160 analyzes signals information (raw and processed) received from airplane 19A to determine the status of airplane 19A. For example, the analysis module 160 may receive a sound signature recorded by the microphone on the mobile device 103 and sent to the service 150. Most commercial aircraft use jet engines; a few use jet engines to drive a propeller, and still fewer use a cylinder and piston arrangement to drive a propeller. Jet engines have a characteristic sound signature that is known or knowable. Different jet engines have different sound signatures. The mobile device microphone 125 may acquire or record the sound associated with jet engine start and low speed operation and provide this sound recording to the service 150. The module 160 may compare the sound signature to specific airplane data (i.e., the sound signature for the specific make and model of the installed jet engines) for the airplane 19A and may determine the airplane 19A engines are at idle or are operating at a sufficiently high RPM that the airplane 19A should be moving on the surface of the airport 19A. Alternately, and in the absence of a jet engine sound signature for comparison, the module 160 may compare the recorded sound signature to a generic jet engine sound signature to determine possible aircraft operation. The module 160 may detect engine speed changes that indicate the airplane is beginning to taxi, or is slowing and stopping. Using recorded sound signatures in comparison to known sound signatures allows the module 160 to determine possible engine operation. The module 160 then may pass the identified possible engine operation to state analysis module 180, where the engine operation information is considered with other information to assess aircraft state.

The airport data module 170 provides information related to a specific airport (i.e., the airport 10) from which the airplane 19A is soon to depart. The information may include a layout of the airport 10 identifying gates, runways, taxiways, and ramps, for example.

The moving map module 175 may receive aircraft positional data from a moving map system installed in the EFB 101.

The state estimation module 180 receives a constant stream of inputs from other modules of the service 150 and executes a repetitive operation to determine if enough data are available to determine if the airplane 19A is progressing toward, has reached, or is leaving a specific aircraft state. If the aircraft state is gate pushback, indications that the airplane 19A is approaching this state include a noise signature for jet engines of the airplane 19A, an access door closed sound recording and/or a recording of a flight public address announcement recorded public that the access door is closed, and ancillary recorded announcements. Gate pushback also may be signaled by signals from the accelerometers, GPS signals, and other information. The module 180 logic may include a simple algorithm in which each of the possible inputs is weighted, and once a total value is reached, the module 180 declares the airplane 19A has reached a specific state, in this example, gate pushback.

The state time estimation module 190 estimates a time at which the airplane 19A will reach its next aircraft state; for example, the time from gate pushback to runway entry, and the time from runway entry to aircraft takeoff. The module 190 may base this information on specific airport data such as length of a taxiway from the airplane's position at gate pushback. The module 190 alternately or in addition, may base this time estimation on historical averages, recorded in data store 155, for such movements. TOBT compared to engine start signal, door closed sound (which can be heard by a microphone on mobile device 103), cabin announcement of door closed, can be used to determine if gate pushback will occur at the target time.

In making the above comparisons and time estimations, the modules 180 and 190, respectively, may refer to historical data. Generally, all comparisons and time estimations may be based on data specific to the departure airport (i.e., airport 10). In addition, the comparisons and estimations may involve more granular calculations, and the comparison and time estimation algorithms may be modified to account for the following, non-inclusive, list of factors: the specific airline; the specific flight of the specific airline; time of year, time of day, season, holidays; weather; flights to specific airports (e.g., ORD, EWR); airport maintenance and system upgrades in progress or completed; and age of the aircraft.

The statistical analysis module 200 performs various statistical and probability calculations. In an embodiment, the module 200 computes a confidence interval (for given confidence levels) that each designated state in airplane 19A's departure sequence will be reached within a specified time—i.e., EOBT at noon, TMAT at 12:10, OFF at 12:15, plus or minus any windows. For example, the module may compute 95% confidence intervals for OFF times given historical data. If airplane 19A's progress toward takeoff falls outside the computer confidence level, the service 150 may notify Local and Center flight management systems and personnel.

An example of one statistical process involves determining confidence level associated with an OFF time for airplane 19A. Assume airplane 19A is assigned daily flight number 202 from airport 10 to airport 10'. Flight 202 makes its OFF time of 12:15 with the following variances, for ten consecutive days: (−20 seconds (1)); (−5 seconds (1)); (+15 seconds (4)); (+45 seconds (1)); and (+120 seconds (3)). The mean OFF time is 12:15 plus 44 seconds, and the standard deviation is 19.899 seconds. If the desired confidence level is 95%, the acceptable confidence interval is 44+/−2.989 seconds. That is, flight 202 will achieve an OFF state at 12:15:44+/−2.989 seconds with a 95% confidence level.

The statistical analysis module 200 may execute more complex algorithmic operations such as, for example, computing the Bayesian probability that airplane 19A will meet its CRT given flight 19A achieved gate pushback at its EOBT; probability airplane 19A will meet its CRT given flight 19A meets its TMAT; probability airplane 19A will meet its TMAT given airplane 19A meets its EOBT; etc. To improve estimations and predictions, the service 150 may incorporate machine learning techniques.

The service 150 may execute its various operations in real time or near real time. That is, for example, the service 150 may compute gate pushback state within, for example, two seconds after events indicating gate pushback has or is occurring, and may compute a confidence level of the remaining designated aircraft states of airplane 19A within the same two seconds. The service 150 then may provide a gate pushback state message and confidence intervals for remaining aircraft states to Local air traffic control 10A and Center 50 traffic control.

The aircraft surface state event track system 100 provides an efficient and accurate indication of aircraft surface state, which may be particularly useful during off-nominal situations like weather triggered diversions to other airports. The system 100 may output information that allows air traffic management personnel and systems to track aircraft surface movement in the absence of dedicated non-movement area surface surveillance systems. Different surface state event track applications and different categories of airports may require different aircraft states. Departure metering at large airports without ramp surveillance may only need gate pushback and taxi start/stop states, while arrival metering may gain the most benefit from movement area entry and takeoff states occurring at small airports. The system 100 preferably uses aircraft states that can automatically be determined from mobile devices. While sensors in EFBs and other mobile devices provide a core element of the aircraft surface state event track system 100, the system 100 may use any available sensor data, but preferably data that are accurate, quickly accessible, and readily and rapidly transmitted. Since Portable EFBs are typically COTS devices, information about embedded sensors should be readily available. For Portable EFBs, the system 100 may use temporary connections the EFBs may have with the aircraft (e.g., GPS, datalink). The system 100 includes App 110 that can access sensor data (e.g., location) and transmit it to the service 150. The service 150 receives and logs data from the App 110. The App 110 also may log the sensor data it accesses and transmits. Once the data are received by the service 150, the service 150 can analyze the data to determine aircraft state. One concern is possible latency of the cellular network for the various situations and vehicle states. A few seconds of latency should not be a problem for most detected events, but a delay of 30 seconds or a minute or more could be. The data may be supplemented with additional information regarding aircraft events such as, for example, engines on, gate pushback, taxi start, taxi stop, spot out, wheels off, wheels on, runway exit, spot in, gate arrival, engines off. Some of these events require supplemental information such as airport surface maps (including gate, spot, and runway locations). The system 100 will not necessarily need to "know" the aircraft's precise location relative to specific airport resources such as gates, ramp areas, or holding spots. The system 100 simply needs to "know" an approximate location and when its location changes beyond a configurable amount. This threshold may be set low enough to provide meaningful updates and high enough to minimize telecommunications costs. Likewise, updating taxi velocity information improves the accuracy of the prediction of whether an aircraft will meet its off-time, but the costs of increased updates must be weighed against the associated improvement in accuracy. While state change information, such as gate pushback, alone provides a good indication as to whether a flight will make its TMAT or takeoff window, a confidence parameter (level, interval) may provide a more quantitative indication of the probability these will be achieved. To determine the confidence levels associated with achieving key events. For a large airport with a lot of surface traffic computing a takeoff time is a challenging problem. A more feasible use of the aircraft surface state event track system 100 could be to predict a takeoff time at a small airport where the TMC has little to no information about the aircraft surface state. Estimating taxi out time at a small airport is inherently easier than a large airport. Likewise, at a large airport estimating TMAT confidence intervals is easier than estimating takeoff time confidence intervals. Each air traffic management application may involve use of statistical and probabilistic methods that are appropriate for predicting key future aircraft surface states. We explore a range of approaches, from simple nominal estimates to advanced machine learning techniques, and capture the potential challenges and benefits of each.

In executing its designed functions, the system 100 differs from current, non-surveillance tracking systems such as ACARS, which attempt to predict aircraft surface movement and position based on complex algorithms that never receive ground-truth signals, and, as a result, are prone to significant errors and inaccuracies.

Figure 2B:
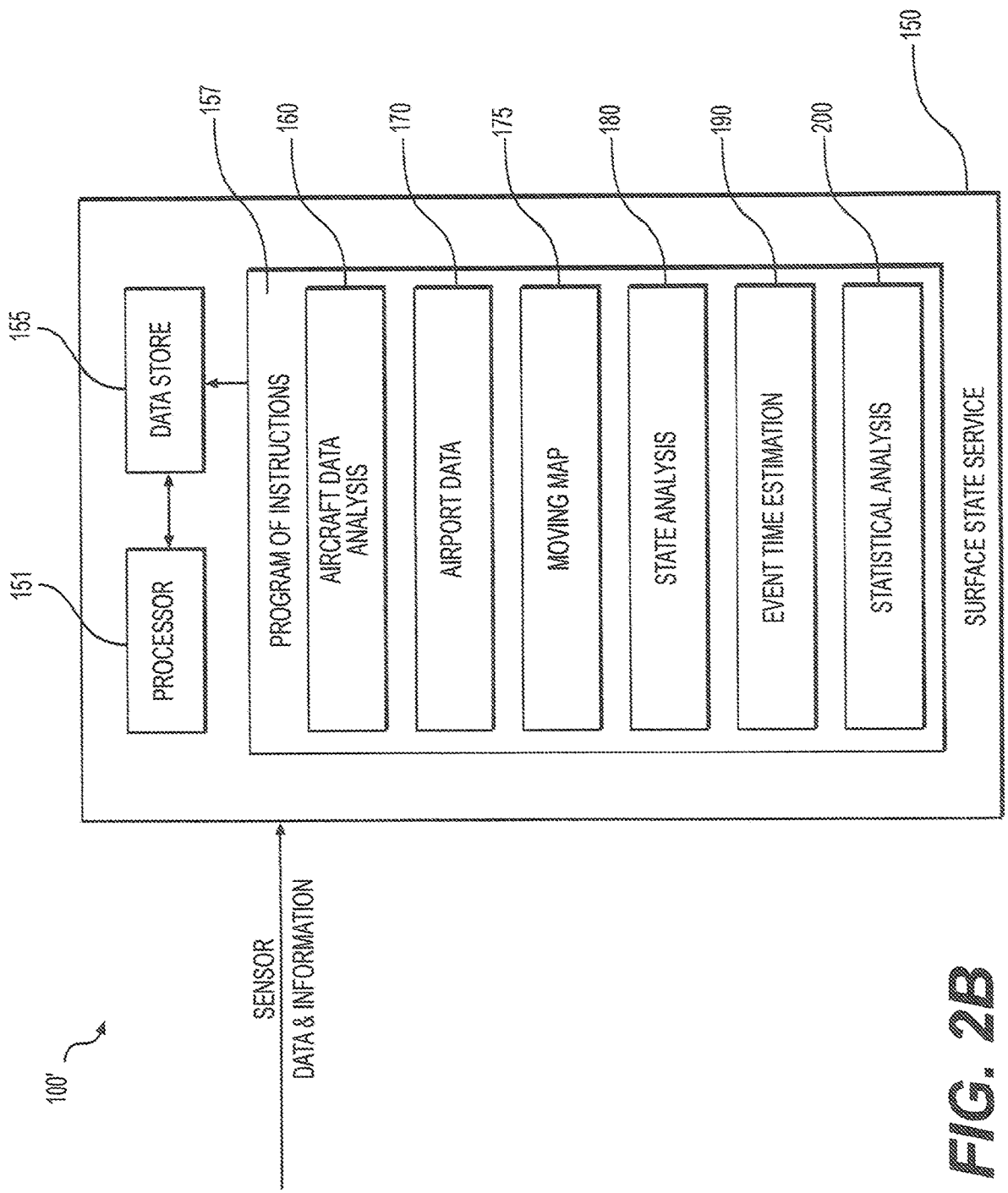
FIGS. 2B-2D illustrate alternate examples of an aircraft surface state event track system.

In an alternate embodiment (see FIG. 2B), an aircraft surface state event track system 100' comprises only the surface state service 150. In this embodiment, the aircraft surface state event track system 100', and specifically the service 150, relies on whatever signals might be received from mobile devices operating in an EFB or otherwise operated by cockpit personnel. Otherwise, operation of the aircraft surface state event track system 100' is the same as that of the system 100.

Figure 2C:
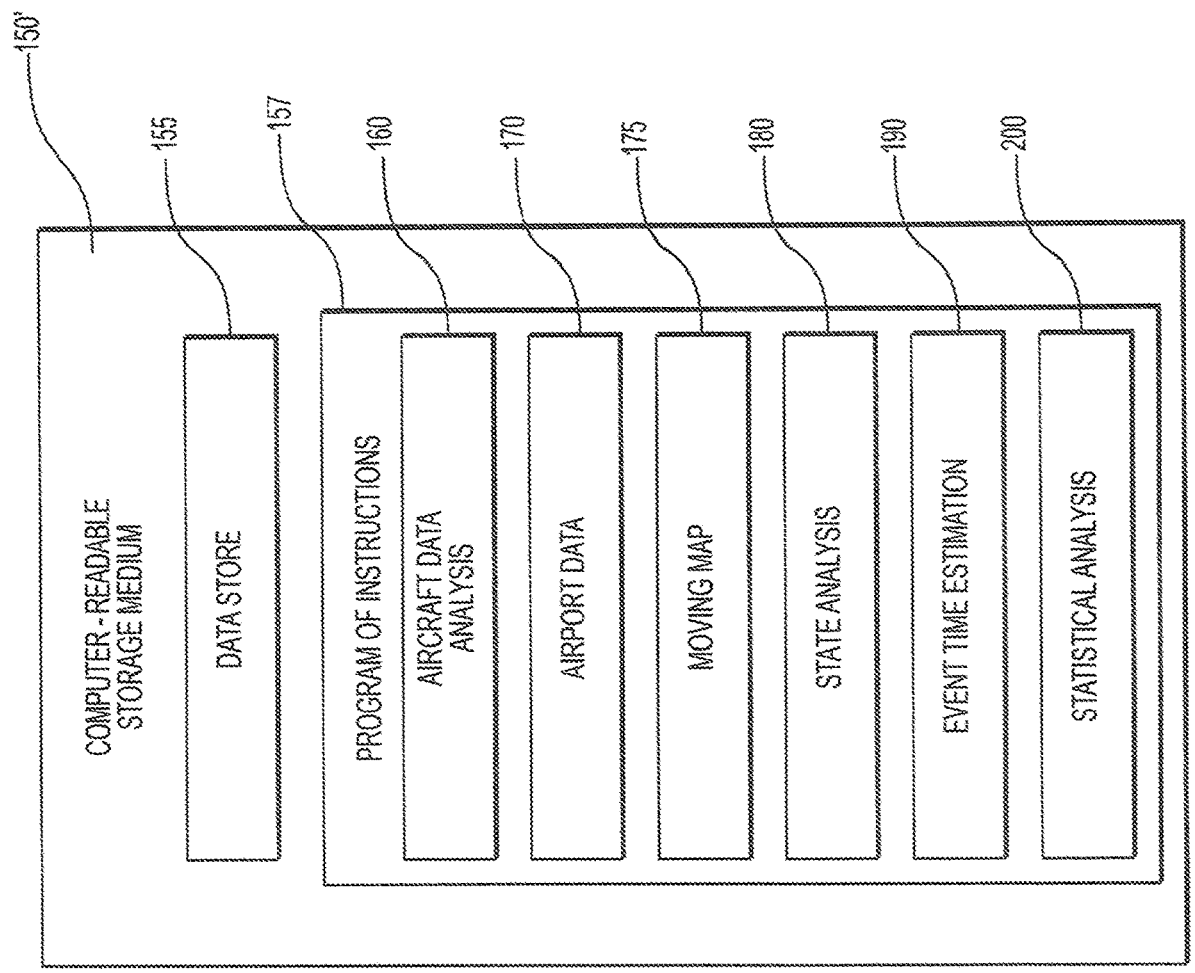

In yet another alternative embodiment (see FIG. 2C), an aircraft surface state event track system 100" comprises a non-transitory, computer-readable storage medium on which are encoded data and programs of instruction, the instructions when executed by a processor, causing the processor to perform the operations disclosed above with respect to the service 150 of the system 100.

Figure 2D:
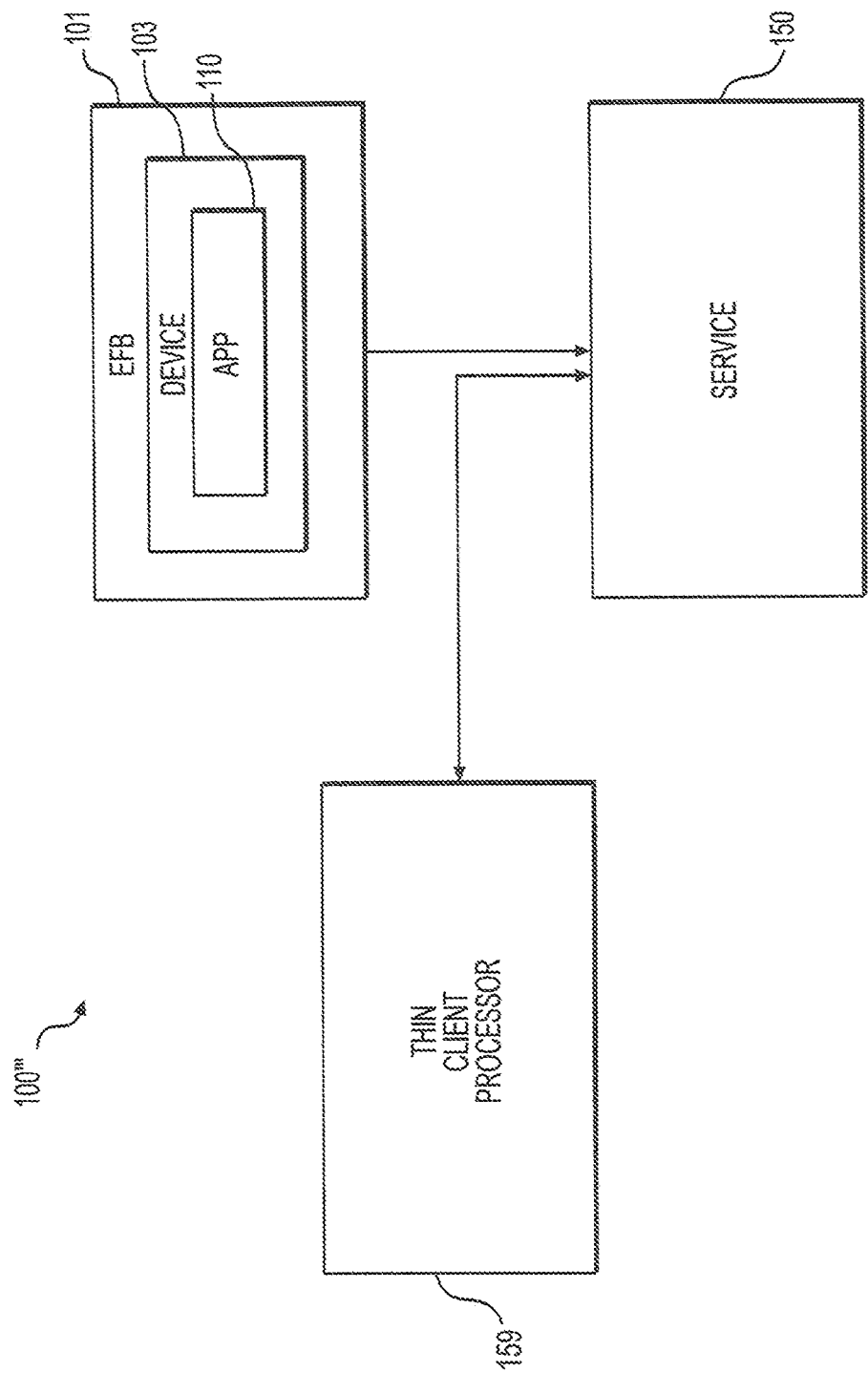

In still another alternative embodiment (see FIG. 2D), an aircraft surface state event track system 100''' may include appropriate software and hardware components installed at Local airports and at Centers that allow the airports and Centers two-way communication with the service 150. For example, the system 100''' may include a thin client program 55 that a flight manager at a Center 50 may use to query the service 150 and to receive replies from the service 150.

Figure 3A:
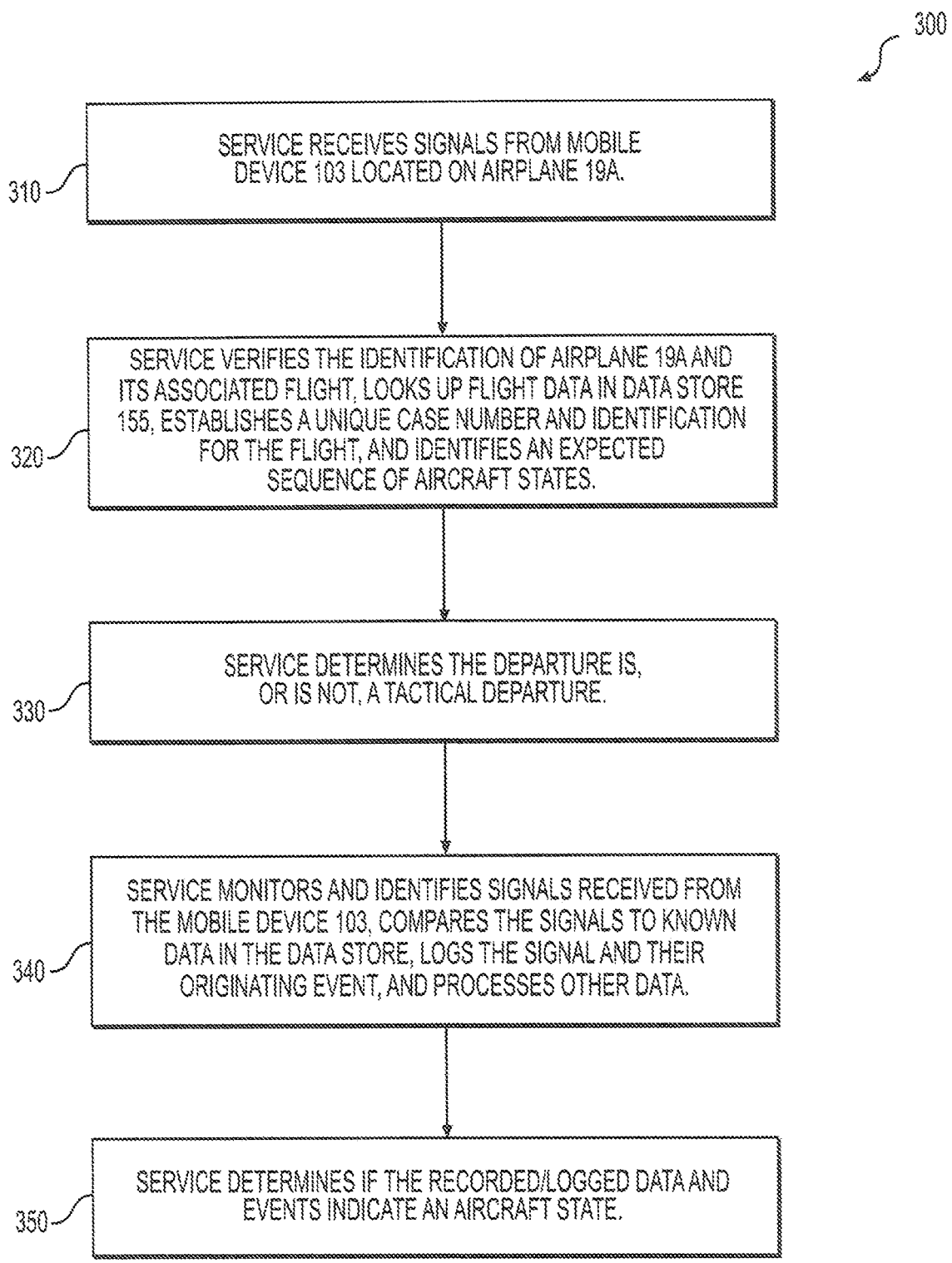
FIGS. 3A-3B illustrate example methods executed by the aircraft surface state event track system of FIG. 2A.
Figure 3B:
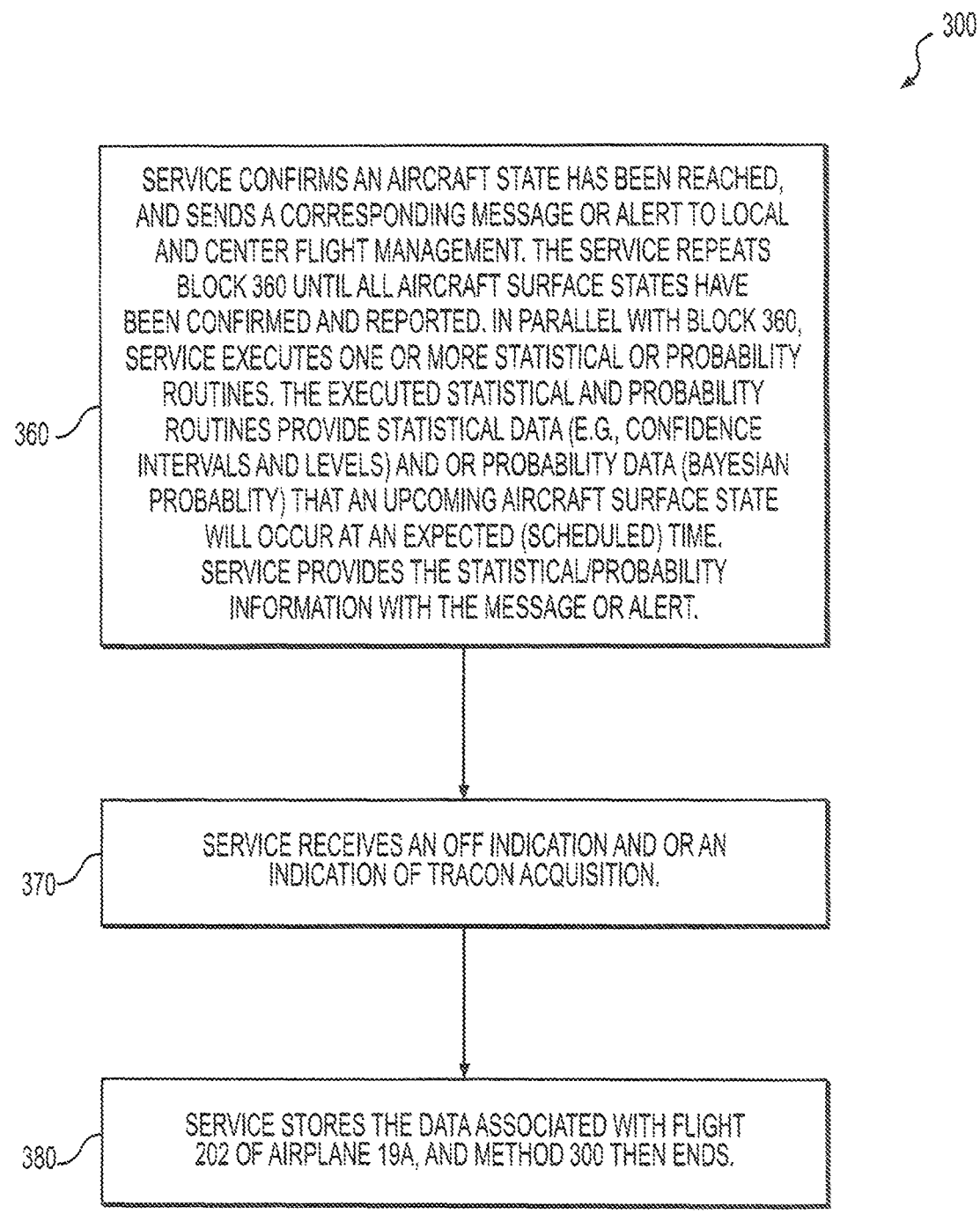

FIGS. 3A-3B illustrate example methods executed by the aircraft surface state event track system 100 of FIG. 2A. The disclosed example methods relate to a flight of airplane 19A from airport 10 to airport 10'. More particularly, FIGS. 3A-3B illustrate example methods executed by processor 151 to determine and track aircraft states during an aircraft departure. In FIG. 3A, method 300 begins in block 310 when the service 150 receives signals from mobile device 103 located on airplane 19A. In block 320, the service 150 verifies the identification of airplane 19A and its associated flight (flight 202 from airport 10 to airport 10'). The verification may include a lookup by a search device executing on processor 151 of flight data in data store 155. The service 150 then establishes a unique case number and identification for the flight, identifies an expected sequence of aircraft states (gate pushback (EOBT), runway entry (TMAT) and takeoff (OFF). The method 300 then moves to block 330 and the service determines the departure is, or is not, a tactical departure. In either case, the method moves to block 340 and the service 150 monitors and identifies signals received from the mobile device 103. In block 340, the service 150 compares, where applicable, the received signals to known data in the data store 155 to identify the signals (for example, engine start, engine spin up, access door closure) and to log the signals and their originating event. The service also may receive or calculate geographic position of airplane 19A, and determine when and if the airplane is moving. The method 300 then moves to block 350 and the service 150 determines if the recorded/logged data and events indicate an aircraft state. For example, the service may receive audio shown to correspond to jet engine low speed operation for airplane 19A, a change in geographic position, acceleration of airplane 19A, and compare the events to the EOBT to conclude the airplane has pushed-back from its gate. Similarly, the service 150 may detect signals, compare the signals to expected events, and determine the airplane 19A has reached the runway (TMAT). Finally, the service 150 may determine the airplane 19A is accelerating to takeoff.

In block 360, the service 150 confirms an aircraft state has been reached, and sends a corresponding message or alert to Local and center flight management. The service repeats block 360 until all aircraft surface states have been confirmed and reported. In parallel with block 360, the service 150 executes one or more statistical or probability routines. The executed statistical and probability routines provide statistical data (e.g., confidence intervals and levels) and or probability data (Bayesian probability) that an upcoming aircraft surface state will occur at an expected (scheduled) time. The service 150 provides the statistical/probability information with the message or alert. In block 370, the service 130 receives an OFF indication and or an indication of TRACON acquisition, and the method 300 moves to block 380, where the processor 151 stores the data associated with flight 202 of airplane 19A, and the method 300 then ends.

The preceding disclosure refers to flowcharts and accompanying descriptions to illustrate the embodiments represented in FIGS. 3A-3B. The disclosed devices, components, and systems contemplate using or implementing any suitable technique for performing the steps illustrated. Thus, FIGS. 3A-3B are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. An automatic and autonomous aircraft surface state event track system for tracking, without aircrew input or monitoring, aircraft state for an airplane operating on movement areas and non-movement areas of an airport, comprising:
   a processor on the airplane; and
   an application, the application comprising a non-transitory-computer-readable storage medium with machine instructions, the application in communication with the processor and in communication with one or more sensors existing on the airplane; wherein the processor executes the machine instructions to:
      identify aircraft surface state events on the movement areas and the non-movement areas, comprising:
         control the one or more sensors existing on the airplane, through the application, to produce sensor signals and to provide the produced sensor signals to the application, wherein the application provides digital representations of the sensor signals to the processor; and
         the processor, using the provided digital representations, identifying aircraft progression toward one or more of the aircraft surface state events, comprising:
            estimating a time of arrival at each of the aircraft surface state events,
      generating a confidence level for each time of arrival, and
         providing time of arrival estimates and corresponding confidence levels to local and center flight control systems.

2. The system of claim 1, comprising:
   a service, remote from the airplane and in communication with the processor, the service comprising a computer executing machine instructions to:
   control a receiver to receive the digital representations from the airplane, compare the received digital representations to known data for the airplane, based on a comparison, determine the airplane is at a defined aircraft surface state, comprising:
      comparing digital audio data recorded on the airplane with known sound profiles for the airplane at the defined aircraft surface state;
      comparing airplane motion data recorded at the airplane with known motion data for the airplane at the defined aircraft surface state; and
      designating a defined surface state reached status based on the comparisons, and direct transmission of a defined aircraft surface state reached message to the local and center flight control systems.

3. The system of claim 2, further comprising the computer executing a statistical routine and provide statistical data from the execution relating to an occurrence of an expected upcoming aircraft surface state and directing transmission of the statistical data with the defined aircraft surface state reached message.

4. The system of claim 2, wherein the processor and the application are implemented in a Portable Electronic Flight Bag.

5. The system of claim 2, wherein:
   the machine instructions are stored on a non-transitory, computer-readable storage medium; and
   the computer and the non-transitory, computer-readable storage medium are components of a flight management center cloud storage device installed at the flight management center.

6. The system of claim 2, wherein the service receives an OFF indication and in response the computer associates the OFF indication with flight and airplane information of the airplane.

7. The system of claim 2, wherein the computer determines the airplane is scheduled for a tactical departure.

8. The system of claim 7, wherein the computer determines a confidence interval for a coordinated release time of the tactical departure.

9. The system of claim 2, wherein to compare the received digital representations to the known data for the aircraft, the computer:
 compares digital audio data recorded at the airplane with known sound profiles for the airplane at the defined aircraft surface states; and
 compares airplane motion data recorded at the airplane with known motion data for the airplane, wherein based on the comparison, the computer determines the airplane is at a defined aircraft surface state, wherein the computer determines defined aircraft surface states comprising gate pushback, runway entry and takeoff and computes a confidence interval for one or more confidence levels for one or more defined aircraft surface states, wherein no information acquired by and processed through the processor provided by the system to a cockpit crew of the airplane.

10. An aircraft surface state event track system, comprising:
 a surface state event track system application instantiated on an airplane;
 a surface state event track system service communicating with the application; and
 one or more processors, at least one processor in communication with the application, the processor executing the application to:
  access one or more sensors onboard the airplane and acquire sensor data from the sensors via an application programming interface (API),
  securely transmit the sensor data the surface state event track system service using one or more of a cellular link and another aircraft onboard datalink, and
  analyze a stream of the sensor data in real-time to derive surface state events and surface state event changes, wherein the surface state event track system service compares derived aircraft state information with key Traffic Flow Management (TFM) event times, the event time comprising estimated off block time (EOBT), target movement area entry time (TMAT), and metering times and calculates a confidence interval and level for the event times.

11. The system of claim 10, wherein the surface state event track system service is cloud-based.

12. The system of claim 10, wherein the surface state event track system service is implemented at a local airport hosting the airplane.

13. The system of claim 10, wherein the surface state event track system service uses as inputs one or more of an approximate aircraft location compared to a mapping of airport terminals, a lack of movement to determine that the airplane is parked at a gate, airplane movement detected over an adjustable period, and supplemental information sources to determine gate assignments.

14. The system of claim 10, wherein the surface state event track system service transmits the confidence interval and level to stakeholders to improve stakeholder performance, comprising:
 transmitting a confidence value of the metering times to a traffic management coordinator (TMC) and an airline operations center (AOC);
 transmitting confidence values for TMATs to a departure reservoir coordinator and to the AOC to avoid missed departure slots; and
 for departures from airports within a freeze horizon to metered airports, transmitting an advanced notice to the TMC that the airplane will not make its metering time.

15. The system of claim 10, wherein the aircraft surface state event track system uses portable electronic flight bags (EFBs) and mobile devices to transmit the sensor data.

16. A method for improving flight management by tracking aircraft surface state events on movement areas and on non-movement areas of an airport, comprising:
 instantiating a surface state event track system application on an airplane, the surface state event track system application in communication with a surface state event track system service external to the airplane; and
 one or more processors, at least one processor communicating with the application, the processor executing the application to:
  access one or more sensors onboard the airplane and acquire sensor data from the sensors via an application programming interface (API),
  securely transmit the sensor data the surface state event track system service using one or more of a cellular link and another aircraft onboard datalink, and
  analyze a stream of the sensor data in real-time to derive surface state events and surface state event changes, and
 the surface state event track system service:
  comparing derived aircraft state information with key Traffic Flow Management (TFM) event times, the event time comprising EOBT, TMAT, and metering times, and
  calculating a confidence interval and level for the event times.

17. The method of claim 16, comprising the surface state event track system service using as inputs one or more of an approximate aircraft location compared to a mapping of airport terminals, a lack of movement to determine that the airplane is parked at a gate, airplane movement detected over an adjustable period, and supplemental information sources to determine gate assignments.

18. The method of claim 16, wherein the surface state event track system service transmits the confidence interval and level comprising:
 transmitting a confidence value of the metering times to a TMC and an AOC;
 transmitting confidence values for TMATs to a departure reservoir coordinator and to the AOC to avoid missed departure slots; and
 for departures from airports within a freeze horizon to metered airports, transmitting an advanced notice to the TMC that the airplane will not make its TBFM metering time.

* * * * *